United States Patent
Agapiou et al.

(10) Patent No.: US 6,472,342 B2
(45) Date of Patent: Oct. 29, 2002

(54) CATALYST COMPOSITION AND METHODS FOR ITS PREPARATION AND USE IN A POLYMERIZATION PROCESS

(75) Inventors: Agapios K. Agapiou; Chi-I Kuo, both of Humble; David M. Glowczwski; Steve K. Ackerman, both of Baytown, all of TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/932,912

(22) Filed: Aug. 20, 2001

(65) Prior Publication Data

US 2002/0026018 A1 Feb. 28, 2002

Related U.S. Application Data

(60) Division of application No. 09/397,410, filed on Sep. 16, 1999, now Pat. No. 6,300,436, which is a continuation-in-part of application No. 09/113,216, filed on Jul. 10, 1998.

(51) Int. Cl.[7] ............................. B01J 31/04; C08F 4/64
(52) U.S. Cl. ...................... 502/170; 502/132; 502/152; 502/154; 526/154; 526/155
(58) Field of Search ................................ 502/132, 152, 502/154, 170

(56) References Cited

U.S. PATENT DOCUMENTS

| 5,034,481 A | | 7/1991 | Funk et al. ................... 526/74 |
| 5,283,278 A | * | 2/1994 | Daire et al. ................. 524/399 |

FOREIGN PATENT DOCUMENTS

| EP | 0005326 | | 11/1979 |
| EP | 0035889 | | 9/1981 |
| EP | 0683180 | | 11/1995 |
| FR | 2169125 | | 9/1973 |
| GB | 1124750 | | 8/1968 |
| GB | 1 402 802 | * | 8/1975 |

* cited by examiner

*Primary Examiner*—David W. Wu
*Assistant Examiner*—Caixia Lu
(74) *Attorney, Agent, or Firm*—Jaimes Sher; Lisa Kimes Jones

(57) ABSTRACT

The present invention relates to a catalyst composition and a method for making the catalyst composition of a polymerization catalyst and a carboxylate metal salt. The invention is also directed to the use of the catalyst composition in the polymerization of olefin(s). In particular, the polymerization catalyst system is supported on a carrier. More particularly, the polymerization catalyst comprises a bulky ligand metallocene-type catalyst system.

20 Claims, No Drawings

CATALYST COMPOSITION AND METHODS FOR ITS PREPARATION AND USE IN A POLYMERIZATION PROCESS

RELATED APPLICATION DATA

The present is a Divisional of U.S. application Ser. No. 09/397,410, filed Sep. 16, 1999, now issued as U.S. Pat. No. 6,300,436, which is a continuation-in-part of U.S. patent application Ser. No. 09/113,216, filed Jul. 10, 1998.

FIELD OF THE INVENTION

The present invention relates to a catalyst composition and methods for preparing the catalyst composition and for its use in a process for polymerizing olefins. In particular, the invention is directed to a method for preparing a catalyst composition of a bulky ligand metallocene-type catalyst system and/or a conventional-type transition metal catalyst system, and a carboxylate metal salt.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene-type catalyst systems. Regardless of these technological advances in the polyolefin industry, common problems, as well as new challenges associated with process operability still exist. For example, the tendency for a gas phase or slurry phase process to foul and/or sheet remains a challenge.

For example, in a continuous slurry process fouling on the walls of the reactor, which act as a heat transfer surface, can result in many operability problems. Poor heat transfer during polymerization can result in polymer particles adhering to the walls of the reactor. These polymer particles can continue to polymerize on the walls and can result in a premature reactor shutdown. Also, depending on the reactor conditions, some of the polymer may dissolve in the reactor diluent and redeposit on for example the metal heat exchanger surfaces.

In a typical continuous gas phase process, a recycle system is employed for many reasons including the removal of heat generated in the process by the polymerization. Fouling, sheeting and/or static generation in a continuous gas phase process can lead to the ineffective operation of various reactor systems. For example, the cooling mechanism of the recycle system, the temperature probes utilized for process control and the distributor plate, if affected, can lead to an early reactor shutdown.

Evidence of, and solutions to, various process operability problems have been addressed by many in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,627,243 discusses a new type of distributor plate for use in fluidized bed gas phase reactors; PCT publication WO 96/08520 discusses avoiding the introduction of a scavenger into the reactor; U.S. Pat. No. 5,461,123 discusses using sound waves to reduce sheeting; U.S. Pat. No. 5,066,736 and EP-A1 0 549 252 discuss the introduction of an activity retarder to the reactor to reduce agglomerates; U.S. Pat. No. 5,610,244 relates to feeding make-up monomer directly into the reactor above the bed to avoid fouling and improve polymer quality; U.S. Pat. No. 5,126,414 discusses including an oligomer removal system for reducing distributor plate fouling and providing for polymers free of gels; EP-A1 0 453 116 published Oct. 23, 1991 discusses the introduction of antistatic agents to the reactor for reducing the amount of sheets and agglomerates; U.S. Pat. No. 4,012,574 discusses adding a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; and U.S. Pat. No. 3,919,185 describes a slurry process using a nonpolar hydrocarbon diluent using a conventional Ziegler-Natta-type or Phillips-type catalyst and a polyvalent metal salt of an organic acid having a molecular weight of at least 300.

There are various other known methods for improving operability including coating the polymerization equipment, for example, treating the walls of a reactor using chromium compounds as described in U.S. Pat. Nos. 4,532,311 and 4,876,320; injecting various agents into the process, for example PCT Publication WO 97/46599 published Dec. 11, 1997 discusses feeding into a lean zone in a polymerization reactor an unsupported, soluble metallocene-type catalyst system and injecting antifoulants or antistatic agents into the reactor; controlling the polymerization rate, particularly on start-up; and reconfiguring the reactor design.

Others in the art to improve process operability have discussed modifying the catalyst system by preparing the catalyst system in different ways. For example, methods in the art include combining the catalyst system components in a particular order; manipulating the ratio of the various catalyst system components; varying the contact time and/or temperature when combining the components of a catalyst system; or simply adding various compounds to the catalyst system. These techniques or combinations thereof are discussed in the literature. Especially illustrative in the art is the preparation procedures and methods for producing bulky ligand metallocene-type catalyst systems, more particularly supported bulky ligand metallocene-type catalyst systems with reduced tendencies for fouling and better operability. Examples of these include: WO 96/11961 published Apr. 26, 1996 discusses as a component of a supported catalyst system an antistatic agent for reducing fouling and sheeting in a gas, slurry or liquid pool polymerization process; U.S. Pat. No. 5,283,278 is directed towards the prepolymerization of a metallocene catalyst or a conventional Ziegler-Natta catalyst in the presence of an antistatic agent; U.S. Pat. Nos.

5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene-type catalyst systems; U.S. Pat. No. 5,661,095 discusses supporting a metallocene-type catalyst on a copolymer of an olefin and an unsaturated silane; PCT publication WO 97/06186 published Feb. 20, 1997 teaches removing inorganic and organic impurities after formation of the metallocene-type catalyst itself, PCT publication WO 97/15602 published May 1, 1997 discusses readily supportable metal complexes; PCT publication WO 97/27224 published Jul. 31, 1997 relates to forming a supported transition metal compound in the presence of an unsaturated organic compound having at least one terminal double bond; and EP-A2-811 638 discusses using a metallocene catalyst and an activating cocatalyst in a polymerization process in the presence of a nitrogen containing antistatic agent.

While all these possible solutions might reduce the level of fouling or sheeting somewhat, some are expensive to employ and/or may not reduce fouling and sheeting to a level sufficient to successfully operate a continuous process, particularly a commercial or large-scale process.

Thus, it would be advantageous to have a polymerization process capable of operating continuously with enhanced reactor operability and at the same time produce new and improved polymers. It would also be highly beneficial to have a continuously operating polymerization process having more stable catalyst productivities, reduced fouling/sheeting tendencies and increased duration of operation.

SUMMARY OF THE INVENTION

This invention provides a method of making a new and improved catalyst composition and for its use in a polymerizing process. The method comprises the step of combining, contacting, blending and/or mixing a catalyst system, preferably a supported catalyst system, with a carboxylate metal salt. In one embodiment the catalyst system comprises a conventional-type transition metal catalyst compound. In the most preferred embodiment the catalyst system comprises a bulky ligand metallocene-type catalyst compound. The combination of the catalyst system and the carboxylate metal salt is useful in any olefin polymerization process. The preferred polymerization processes are a gas phase or a slurry phase process, most preferably a gas phase process.

In an embodiment, the invention provides for a method of making a catalyst composition useful for the polymerization of olefin(s), the method including combining, contacting, blending and/or mixing a polymerization catalyst with at least one carboxylate metal salt. In an embodiment, the polymerization catalyst is a conventional-type transition metal polymerization catalyst, more preferably a supported conventional-type transition metal polymerization catalyst. In the most preferred embodiment, the polymerization catalyst is a bulky ligand metallocene-type catalyst, most preferably a supported bulky ligand metallocene-type polymerization catalyst.

In one preferred embodiment, the invention is directed to a catalyst composition comprising a catalyst compound, preferably a conventional-type transition metal catalyst compound, more preferably a bulky ligand metallocene-type catalyst compound, an activator and/or cocatalyst, a carrier, and a carboxylate metal salt.

In the most preferred method of the invention, the carboxylate metal salt is blended, preferably dry blended, and most preferably tumble dry blended or fluidized, with a supported catalyst system or polymerization catalyst comprising a carrier. In this most preferred embodiment, the polymerization catalyst includes at least one bulky ligand metallocene-type catalyst compound, an activator and a carrier.

In yet another embodiment, the invention relates to a process for polymerizing olefin(s) in the presence of a catalyst composition comprising a polymerization catalyst and a carboxylate metal salt, preferably the polymerization catalyst comprises a carrier, more preferably the polymerization catalyst comprises one or more of combination of a conventional-type catalyst compound and/or a bulky ligand metallocene-type catalyst compound.

In a preferred method for making the catalyst composition of the invention, the method comprises the steps of combining a bulky ligand metallocene-type catalyst compound, an activator and a carrier to form a supported bulky ligand metallocene-type catalyst system, and contacting the supported bulky ligand metallocene-type catalyst compound with a carboxylate metal salt. In the most preferred embodiment, the supported bulky ligand metallocene-type catalyst system and the carboxylate metal salt are in a substantially dry state or dried state.

In an embodiment, the invention provides for a process for polymerizing olefin(s) in the presence of a polymerization catalyst having been combined, contacted, blended, or mixed with at least one carboxylate metal salt.

DETAILED DESCRIPTION OF THE INVENTION

Introduction

The invention is directed toward a method for making a catalyst composition and to the catalyst composition itself. The invention also relates to a polymerization process having improved operability and product capabilities using the catalyst composition. It has been suprisingly discovered that using a carboxylate metal salt in combination with a catalyst system results in a substantially improved polymerization process. Particularly surprising is where the catalyst system is supported on carrier, more so where the catalyst system includes a bulky ligand metallocene-type catalyst system, and even more so where the bulky ligand metallocene-type catalysts are very active and/or are highly incorporating of comonomer.

While not wishing to be bound by any theory, it is believed that these bulky ligand metallocene-type catalysts are more prone to sheeting and/or fouling. It is believed that the very high activity catalysts can result in the generation of extreme heat local to the growing polymer particle. It is theorized that these extreme conditions lead to increased levels of sheeting and/or fouling. Also hypothesized is that the polymers produced by bulky ligand metallocene-type catalysts form very tough polymer sheets. Thus, it is difficult to break-up and remove any of these sheets that may form in the reactor.

Furthermore, it was very unexpected that fractional melt index and higher density polymers could be produced in a polymerization process using the polymerization catalyst and carboxylate metal salt combination with improved operability. This discovery was especially important in that it is well known in the polymer industry that, from a process operability standpoint, these types of polymers are difficult to produce.

Utilizing the polymerization catalysts described below in combination with a carboxylate metal salt results in a substantial improvement in process operability, a significant reduction in sheeting and fouling, improved catalyst performance, better polymer particle morphology with no adverse effect on the physical polymer properties, and the capability to produce a broader range of polymers.

Catalyst Components and Catalyst Systems

All polymerization catalysts including conventional-type transition metal catalysts are suitable for use in the polymerizing process of the invention. However, processes using bulky ligand and/or bridged bulky ligand, metallocene-type catalysts are particularly preferred. The following is a non-limiting discussion of the various polymerization catalysts useful in the invention.

Conventional-type Transition Metal Catalysts

Conventional-type transition metal catalysts are those traditional Ziegler-Natta catalysts and Phillips-type chromium catalyst well known in the art. Examples of conventional-type transition metal catalysts are discussed in U.S. Pat. Nos. 4,115,639, 4,077,904, 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups III to VIII, preferably IVB to VIB of the Periodic Table of Elements.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference. The conventional-type transition metal catalysts of the invention may also have the general formula $M'_tM''X_{2t}Y_uE$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, $-NR_2$, $-OR$, $-SR$, $-COOR$, or $-OSOOR$, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5.2CH_3COOC_2H_5$, $Mg_3Ti_2Cl_{12}.7CH_3COOC_2H_5$, $MgTiCl_5.6C_2H_5OH$, $MgTiCl_5.100CH_3OH$, $MgTiCl_5.tetrahydrofuran$, $MgTi_2Cl_{12}.7C_6H_5CN$, $Mg_3Ti_2Cl_{12}.6C_6H_5COOC_2H_5$, $MgTiCl_6.2CH_3COOC_2H_5$, $MgTiCl_6.6C_5H_5N$, $MgTiCl_5(OCH_3).2CH_3COOC_2H_5$, $MgTiCl_5N(C_6H_5)_2.3CH_3COOC_2H_5$, $MgTiBr_2Cl_4.2(C_2H_5)_2O$, $MnTiCl_5.4C_2H_5OH$, $Mg_3V_2Cl_{12}.7CH_3COOC_2H_5$, $MgZrCl_6.4$ tetrahydrofuran. Other catalysts may include cationic catalysts such as $AlCl_3$, and other cobalt and iron catalysts well known in the art.

Typically, these conventional-type transition metal catalyst compounds excluding some convention-type chromium catalyst compounds are activated with one or more of the conventional-type cocatalysts described below.

Conventional-type Cocatalysts

Conventional-type cocatalyst compounds for the above conventional-type transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Group IA, IIA and IIIA useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group IIA metals, and mono- or di-organohalides and hydrides of Group IIIA metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromoaluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

For purposes of this patent specification and appended claims conventional-type transition metal catalyst compounds exclude those bulky ligand metallocene-type catalyst compounds discussed below. For purposes of this patent specification and the appended claims the term "cocatalyst" refers to conventional-type cocatalysts or conventional-type organometallic cocatalyst compounds. Bulky ligand metallocene-type catalyst compounds and catalyst systems for use in combination with a carboxylate metal salt of the invention are described below.

Bulky Ligand Metallocene-type Catalyst Compounds

Generally, bulky ligand metallocene-type catalyst compounds include half and full sandwich compounds having one or more bulky ligands including cyclopentadienyl-type structures or other similar functioning structure such as pentadiene, cyclooctatetraendiyl and imides. Typical bulky ligand metallocene-type compounds are generally described as containing one or more ligands capable of $\eta$-5 bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096, 867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, bulky ligand metallocene-type catalyst compounds of the invention are represented by the formula:

$$L^A L^B MQ \qquad (I)$$

where M is a metal from the Periodic Table of the Elements and may be a Group 3 to 10 metal, preferably, a Group 4, 5 or 6 transition metal or a metal from the lanthanide or actinide series, more preferably M is a transition metal from Group 4, even more preferably zirconium, hafinium or titanium. $L^A$ and $L^B$ are bulky ligands that include cyclopentadienyl derived ligands or substituted cyclopentadienyl derived ligands or heteroatom substituted or heteroatom containing cyclopentadienyl derived ligands, or hydrocarbyl substituted cyclopentadienyl derived ligands, or moieties such as indenyl ligands, benzindenyl ligands, fluorenyl ligands, octahydrofluorenyl ligands, cyclooctatetraendiyl ligands, azenyl ligands and borabenzene ligands, and the like, including hydrogenated versions thereof. Also, $L^A$ and $L^B$ may be any other ligand structure capable of $\eta$-5 bonding to M, for example $L^A$ and $L^B$ may comprises one or more heteroatoms, for example, nitrogen, silicon, boron, germanium, and phosphorous, in combination with carbon atoms to form a cyclic structure, for example a heterocyclopentadienyl ancillary ligand. Further, each of $L^A$ and $L^B$ may also be other types of bulky ligands including but not limited to bulky amides, phosphides, alkoxides, aryloxides, imides, carbolides, borollides, porphyrins, phthalocyanines, corrins and other polyazomacrocycles. Each $L^A$ and $L^B$ may be the same or different type of bulky ligand that is $\pi$-bonded to M.

Each $L^A$ and $L^B$ may be substituted with a combination of substituent groups R. Non-limiting examples of substituent groups R include hydrogen or linear, branched, alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents R include methyl, ethyl, propyl, butyl, pentyl, hexyl, cyclopentyl, cyclohexyl, benzyl or phenyl groups, halogens and the like, including all their isomers, for example tertiary butyl, iso-propyl, etc. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, nitrogen, phosphorous, oxygen, tin, germanium and the like including olefins such as but not limited to olefinically unsaturated substituents including vinyl-terminated ligands, for example but-3-enyl, 2-vinyl, or hexene-1. Also, at least two R groups, preferably two adjacent R groups are joined to form a ring structure having from 4 to 30 atoms selected from carbon, nitrogen, oxygen, phosphorous, silicon, germanium, boron or a combination thereof. Also, an R group such as 1-butanyl may form a carbon sigma bond to the metal M.

Other ligands may be bonded to the transition metal, such as a leaving group Q. Q may be independently monoanionic labile ligands having a sigma-bond to M. Non-limiting examples of Q include weak bases such as amines, phosphines, ether, carboxylates, dienes, hydrocarbyl radicals having from 1 to 20 carbon atoms, hydrides or halogens and the like, and combinations thereof. Other examples of Q radicals include those substituents for R as described above and including cyclohexyl, heptyl, tolyl, trifluromethyl, tetramethylene and pentamethylene, methylidene, methoxy, ethyoxy, propoxy, phenoxy, bis(N-methylanilide), dimethylamide, dimethylphosphide radicals and the like.

In addition, bulky ligand metallocene-type catalyst compounds of the invention are those where $L^A$ and $L^B$ are bridged to each other by a bridging group, A. These bridged compounds are known as bridged, bulky ligand metallocene-type catalyst compounds. Non-limiting examples of bridging group A include bridging radicals of at least one Group 14 atom, such as but not limited to carbon, oxygen, nitrogen, silicon, germanium and tin, preferably carbon, silicon and germanium, most preferably silicon. Other non-limiting examples of bridging groups A include dimethylsilyl, diethylsilyl, methylethylsilyl, trifluoromethylbutylsilyl, bis(trifluoromethyl)silyl, di-n-butylsilyl, silylcyclobutyl, di-i-propylsilyl, di-cyclohexylsilyl, di-phenylsilyl, cyclohexylphenylsilyl, t-butylcyclohexylsilyl, di-t-butylphenylsilyl, di(p-tolyl)silyl, dimethylgermyl, diethylgermyl, methylene, dimethylmethylene, diphenylmethylene, ethylene, 1-2-dimethylethylene, 1,2-diphenylethylene, 1,1,2,2-tetramethylethylene, dimethylmethylenedimethylsilyl, methylenediphenylgermyl, methylamine, phenylamine, cyclohexylamine, methylphosphine, phenylphosphine, cyclohexylphosphine and the like.

In another embodiment, the bulky ligand metallocene-type catalyst compound of the invention is represented by the formula:

$$(C_5H_{4-d}R_d)A_x(C_5H_{4-d}R_d)M \ Qg_{-2} \quad (II)$$

wherein M is a Group 4, 5, 6 transition metal, $(C_5H_{4-d}R_d)$ is an unsubstituted or substituted cyclopentadienyl derived bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of carbon, germanium, silicon, tin, phosphorous or nitrogen atom containing radical bridging two $(C_5H_{4-d}R_d)$ rings; more particularly, non-limiting examples of A may be represented by $R'_2C$, $R'_2Si$, $R'_2Si$ $R'_2Si$, $R'_2Si$ $R'_2C$, $R'_2Ge$, $R'_2Ge$, $R'_2Si$ $R'_2Ge$, $R'_2GeR'_2C$, $R'N$, $R'P$, $R'_2C$ $R'N$, $R'_2C$ $R'P$, $R'_2Si$ $R'N$, $R'_2Si$ $R'P$, $R'_2GeR'N$, $R'_2Ge$ $R'P$, where $R'$ is independently, a radical group which is hydride, $C_{1-30}$ hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen; each Q which can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclometallated hydrocarbyl ligand or other divalent anionic chelating ligand, where g is an integer corresponding to the formal oxidation state of M, and d is an integer selected from the 0, 1, 2, 3 or 4 and denoting the degree of substitution and x is an integer from 0 to 1.

In one embodiment, the bulky ligand metallocene-type catalyst compounds are those where the R substituents on the bulky ligands $L^A$, $L^B$, $(C_5H_{4-d}R_d)$ of formulas (I) and (II) are substituted with the same or different number of substituents on each of the bulky ligands.

In a preferred embodiment, the bulky ligand metallocene-type catalyst is represented by formula (II), where x is 1.

Other bulky ligand metallocene-type catalysts compounds useful in the invention include bridged, mono-bulky ligand heteroatom containing metallocene-type compounds. These types of catalysts and catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055, 438, 5,198,401, 5,227,440 and 5,264,405 and European publication EP-A-0 420 436, all of which are herein fully incorporated by reference. Other bulky ligand metallocene-type catalysts useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401 and 5,723,398 and PCT publications WO 93/08221, WO 93/08199, WO 95/07140, WO 98/11144 and European publications EP-A-0 578 838, EP-A-0 638 595, EP-B-0 513 380 and EP-A1-0 816 372, all of which are herein fully incorporated by reference.

In another embodiment of this invention the bridged, mono-bulky ligand heteroatom containing metallocene-type catalyst compounds useful in the invention are represented by the formula:

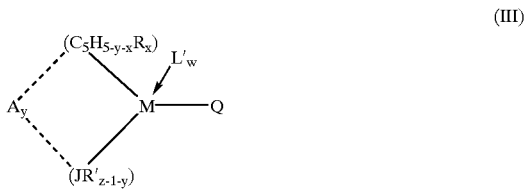

(III)

wherein M is Ti, Zr or Hf; $(C_5H_{5-y-x}R_x)$ is a cyclopentadienyl ring or ring system which is substituted with from 0 to 5 substituent groups R, "x" is 0, 1, 2, 3, 4 or 5 denoting the degree of substitution, and each substituent group R is, independently, a radical selected from a group consisting of $C_1-C_{20}$ hydrocarbyl radicals, substituted $C_1-C_{20}$ hydrocarbyl radicals wherein one or more hydrogen atoms is replaced by a halogen atom, $C_1-C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4-C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1-C_{20}$ hydrocarbyl radicals wherein one or more hydrogen atoms is replaced by a halogen atom, y is 0 or 1, and "z" is the coordination number of the element J;

each Q is, independently, any univalent anionic ligand such as halogen, hydride, or substituted or unsubstituted $C_1-C_{30}$ hydrocarbyl, alkoxide, aryloxide, amide or phosphide, provided that two Q may be an alkylidene, a cyclometallated hydrocarbyl or any other divalent anionic chelating ligand; and n may be 0,1 or 2;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2 or 3.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference. Preferably, the bulky ligand type metallocene-type catalyst compound, the monocycloalkadienyl catalyst compound, may be represented by one of the following formulas:

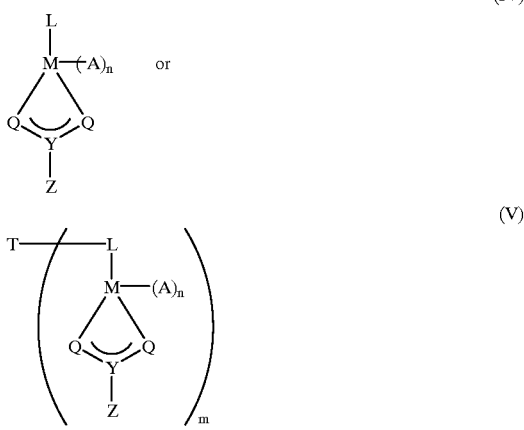

wherein M is a transition metal from Group 4, 5 or 6, preferably titanium zirconium or hafnium, most preferably zirconium or hafnium; L is a substituted or unsubstituted, pi-bonded ligand coordinated to M, preferably L is a cycloalkadienyl bulky ligand, for example cyclopentadienyl, indenyl or fluorenyl bulky ligands, optionally with one or more hydrocarbyl substituent groups having from 1 to 20 carbon atoms; each Q is independently selected from the group consisting of —O—, —NR—, —CR$_2$— and —S—, preferably oxygen; Y is either C or S, preferably carbon; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$; n is 1 or 2, preferably 1; A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent; and T is a bridging group selected from the group consisting of alkylene and arylene groups containing from 1 to 10 carbon atoms optionally substituted with carbon or heteroatom(s), germanium, silicon and alkyl phosphine; and m is 2 to 7, preferably 2 to 6, most preferably 2 or 3.

In formulas (IV) and (V), the supportive substituent formed by Q, Y and Z is a unicharged polydentate ligand exerting electronic effects due to its high polarizability, similar to the cyclopentadienyl ligand. In the most preferred embodiments of this invention, the disubstituted carbamates and the carboxylates are employed. Non-limiting examples of these bulky ligand metallocene-type catalyst compounds include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(trimethylacetate), (2-methylindenyl) zirconium tris(diethylcarbamate), (methylcyclopentadienyl) zirconium tris(trimethylacetate), cyclopentadienyl tris(trimethylacetate), tetrahydroindenyl zirconium tris(trimethylacetate), and (pentamethylcyclopentadienyl) zirconium tris(benzoate). Preferred examples are indenyl zirconium tris(diethylcarbamate), indenyl zirconium tris(trimethylacetate), and (methylcyclopentadienyl) zirconium tris(trimethylacetate).

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, that bulky ligand metallocene-type catalyst compound complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, which are all herein fully incorporated by reference, may be combined with a carboxylate metal salt for use in the process of invention. These complexes can be either dialkyl ether adducts, or alkylated reaction products of the described dihalide complexes that can be activated to a cationic state by the conventional-type cocatalysts or the activators of this invention described below.

Also included as bulky ligand metallocene-type catalyst compounds are those diimine based ligands for Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384 and U.S. Pat. No. 5,851,945, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference. Other bulky ligand metallocene-type catalysts are described as bis(hydroxy aromatic nitrogen ligands) in U.S. Pat. No. 5,852,146, which is incorporated herein by reference. Other metallocene-type catalysts containing one or more Group 15 atoms include those described in WO 98/46651, which is herein incorporated herein by reference. Still another metallocene-type bulky ligand metallocene-type catalysts include those multinuclear bulky ligand metallocene-type catalysts as described in WO 99/20665, which is incorporated herein by reference.

It is contemplated in some embodiments, that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

It is also contemplated that in one embodiment, the bulky ligand metallocene-type catalysts of the invention include their structural or optical or enantiomeric isomers (meso and racemic isomers) and mixtures thereof. In another embodiment the bulky ligand metallocene-type compounds of the invention may be chiral and/or a bridged bulky ligand metallocene-type catalyst compound.

Activator and Activation Methods For the Bulky Ligand Metallocene-type Catalyst Compounds The above described bulky ligand metallocene-type catalyst compounds of the invention are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene-type catalyst compounds of the invention as described above. Non-limiting activators, for example may include a Lewis acid or a non-coordinating ionic activator or ionizing activator or any other compounds including Lewis bases, aluminum alkyls, conventional-type cocatalysts (previously described herein) and combinations thereof that can convert a neutral bulky ligand metallocene-type catalyst compound to a catalytically active bulky ligand metallocene-type cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene-type catalyst compound.

In one embodiment, an activation method using ionizing ionic compounds not containing an active proton but capable of producing both a bulky ligand metallocene-type catalyst cation and a noncoordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B 1–0 279 586 and EP-A-0 594–218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2, 2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a bulky ligand metallocene-type catalyst compound. WO 99/18135 incorporated herein by reference describes the use of organo-boron-aluminum activators. EP-B1–0 781 299 describes using a silylium salt in combination with a non-coordinating compatible anion. Also, methods of activation such as using radiation (see EP-B 1–0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and PCT WO 98/32775, which are herein incorporated by reference.

Mixed Catalysts

It is also within the scope of this invention that the above described bulky ligand metallocene-type catalyst compounds can be combined with one or more of the catalyst compounds represented by formula (I), (II), (III), (IV) and (V) with one or more activators or activation methods described above.

It is further contemplated by the invention that other catalysts can be combined with the bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Method for Supporting

The above described bulky ligand metallocene-type catalyst compounds and catalyst systems and conventional-type transition metal catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a bulky ligand metallocene-type catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, most preferably an inorganic oxide, has a surface area in the range of from about 10 to about 700 $m^2$/g, pore volume in the range of from about 0.1 to about 4.0 cc/g and average particle size in the range of from about 10 to about 500 $\mu$m. More preferably, the surface area of the carrier is in the range of from about 50 to about 500 $m^2$/g, pore volume of from about 0.5 to about 3.5 cc/g and average particle size of from about 20 to about 200 $\mu$m. Most preferably the surface area of the carrier is in the range of from about 100 to about 400 $m^2$/g, pore volume from about 0.8 to about 3.0 cc/g and average particle size is from about 20 to about 100 $\mu$m. The average pore size of a carrier of the invention is typically in the range of from about 10 Å to 1000 Å, preferably 50 Å to about 500 Å, and most preferably 75 Å to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297 all of which are herein fully incorporated by reference.

Examples of supporting the conventional-type catalyst systems of the invention are described in U.S. Pat. Nos. 4,894,424, 4,376,062, 4,395,359, 4,379,759, 4,405,495 4,540758 and 5,096,869, all of which are herein incorporated by reference.

It is contemplated that the bulky ligand metallocene-type catalyst compounds of the invention may be deposited on the same or separate supports together with an activator, or the activator may be used in an unsupported form, or may be deposited on a support different from the supported bulky ligand metallocene-type catalyst compounds of the invention, or any combination thereof.

There are various other methods in the art for supporting a polymerization catalyst compound or catalyst system of the invention. For example, the bulky ligand metallocene-type catalyst compound of the invention may contain a polymer bound ligand as described in U.S. Pat. Nos. 5,473, 202 and 5,770,755, which is herein fully incorporated by reference; the bulky ligand metallocene-type catalyst system of the invention may be spray dried as described in U.S. Pat. No. 5,648,310, which is herein fully incorporated by reference; the support used with the bulky ligand metallocene-type catalyst system of the invention is functionalized as described in European publication EP-A-0 802 203, which is herein fully incorporated by reference; or at least one substituent or leaving group is selected as described in U.S. Pat. No. 5,688,880, which is herein fully incorporated by reference.

In a preferred embodiment, the invention provides for a supported bulky ligand metallocene-type catalyst system that includes a surface modifier that is used in the preparation of the supported catalyst system, as described in PCT publication WO 96/11960 which is herein fully incorporated by reference.

A preferred method for producing the supported bulky ligand metallocene-type catalyst system of the invention is described below and can be found in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In this preferred method, the bulky ligand metallocene-type catalyst compound is slurried in a liquid to form a metallocene solution and a separate solution is formed containing an activator and a liquid. The liquid may be any compatible solvent or other liquid capable of forming a solution or the like with the bulky ligand metallocene-type catalyst compounds and/or activator of the invention. In the most preferred embodiment the liquid is a cyclic aliphatic or aromatic hydrocarbon, most preferably toluene. The bulky ligand metallocene-type catalyst compound and activator solutions are mixed together and added to a porous support or the porous support is added to the solutions such that the total volume of the bulky ligand metallocene-type catalyst compound solution and the activator solution or the bulky ligand metallocene-type catalyst compound and activator solution is less than five times the pore volume of the porous support, more preferably less than four times, even more preferably less than three times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the metal of the bulky ligand metallocene-type catalyst compounds are in the range of between 0.3:1 to 2000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the catalyst is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system and/or a conventional-type transition metal catalysts of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference. A prepolymerized catalyst system for purposes of this patent specification and appended claim is a supported catalyst system.

Carboxylate Metal Salt

Carboxylate metal salts are well known in the art as additives for use with polyolefins, for example as a film processing aid. These types of post reactor processing additives are commonly used as emulsifying agents, antistat and antifogging agents, stabilizers, foaming aids, lubrication aids, mold release agents, nucleating agents, and slip and antiblock agents and the like. Thus, it was truly unexpected that these post reactor agents or aids would be useful with a polymerization catalyst to improve the operability of a polymerization process.

For the purposes of this patent specification and appended claims the term "carboxylate metal salt" is any mono- or di- or tri-carboxylic acid salt with a metal portion from the Periodic Table of Elements. Non-limiting examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

In one embodiment, the carboxylate metal salt is represented by the following general formula:

$$M(Q)_x(OOCR)_Y$$

where M is a metal from Groups 1 to 16 and the Lanthanide and Actinide series, preferably from Groups 1 to 7 and 13 to 16, more preferably from Groups 3 to 7 and 13 to 16, even more preferably Groups 2 and 13, and most preferably Group 13; Q is halogen, hydrogen, a hydroxy or hydroxide, alkyl, alkoxy, aryloxy, siloxy, silyl or sulfonate group; R is a hydrocarbyl radical having from 2 to 100 carbon atoms, preferably 4 to 50 carbon atoms; and x is an integer from 0 to 3 and y is an integer from 1 to 4 and the sum of x and y is equal to the valence of the metal. In a preferred embodiment of the above formula y is an integer from 1 to 3, preferably 1 to 2, especially where M is a Group 13 metal.

Non-limiting examples of R in the above formula include hydrocarbyl radicals having 2 to 100 carbon atoms that include alkyl, aryl, aromatic, aliphatic, cyclic, saturated or unsaturated hydrocarbyl radicals. In an embodiment of the invention, R is a hydrocarbyl radical having greater than or equal to 8 carbon atoms, preferably greater than or equal to 12 carbon atoms and more preferably greater than or equal to 17 carbon atoms. In another embodiment R is a hydrocarbyl radical having from 17 to 90 carbon atoms, preferably 17 to 72, and most preferably from 17 to 54 carbon atoms.

Non-limiting examples of Q in the above formula include one or more, same or different, hydrocarbon containing group such as alkyl, cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. Also, Q in one embodiment is an inorganic group such as a halide, sulfate or phosphate.

In one embodiment, the more preferred carboxylate metal salts are those aluminum carboxylates such as aluminum mono, di- and tri-stearates, aluminum octoates, oleates and cyclohexylbutyrates. In yet a more preferred embodiment, the carboxylate metal salt is $(CH_3(CH_2)_{16}COO)_3Al$, a aluminum tri-stearate (preferred melting point 115° C.), $(CH_3(CH_2)_{16}COO)_2$—Al—OH, a aluminum di-stearate (preferred melting point 145° C.), and a $CH_3(CH_2)_{16}COO$—Al(OH)$_2$, an aluminum mono-stearate (preferred melting point 155° C.).

Non-limiting commercially available carboxylate metal salts for example include Witco Aluminum Stearate # 18, Witco Aluminum Stearate # 22, Witco Aluminum Stearate #132 and Witco Aluminum Stearate EA Food Grade, all of which are available from Witco Corporation, Memphis, Tenn.

In one embodiment the carboxylate metal salt has a melting point from about 30° C. to about 250° C., more preferably from about 37° C. to about 220° C., even more preferably from about 50° C. to about 200° C., and most preferably from about 100° C. to about 200° C. In a most preferred embodiment, the carboxylate metal salt is an aluminum stearate having a melting point in the range of from about 135° C. to about 165° C.

In another preferred embodiment the carboxylate metal salt has a melting point greater than the polymerization temperature in the reactor.

Other examples of carboxylate metal salts include titanium stearates, tin stearates, calcium stearates, zinc stearates, boron stearate and strontium stearates.

The carboxylate metal salt in one embodiment may be combined with antistatic agents such as fatty amines, for example, Kemamine AS 990/2 zinc additive, a blend of ethoxylated stearyl amine and zinc stearate, or Kemamine AS 990/3, a blend of ethoxylated stearyl amine, zinc stearate and octadecyl-3,5-di-tert-butyl-4-hydroxyhydrocinnamate. Both these blends are available from Witco Corporation, Memphis, Tenn.

Method of Preparing the Catalyst Composition

The method for making the catalyst composition generally involves the combining, contacting, blending, and/or mixing of a catalyst system or polymerization catalyst with a carboxylate metal salt.

In one embodiment of the method of the invention, a conventional-type transition metal catalyst and/or a bulky ligand metallocene-type catalyst is combined, contacted, blended, and/or mixed with at least one carboxylate metal salt. In a most preferred embodiment, the conventional-type transition metal catalyst and/or the bulky ligand metallocene-type catalyst are supported on a carrier.

In another embodiment, the steps of the method of the invention include forming a polymerization catalyst, preferably forming a supported polymerization catalyst, and contacting the polymerization catalyst with at least one carboxylate metal salt. In a preferred method, the polymerization catalyst comprises a catalyst compound, an activator or cocatalyst and a carrier, preferably the polymerization catalyst is a supported bulky ligand metallocene-type catalyst.

One in the art recognizes that depending on the catalyst system and the carboxylate metal salt used certain conditions of temperature and pressure would be required to prevent, for example, a loss in the activity of the catalyst system.

In one embodiment of the method of the invention the carboxylate metal salt is contacted with the catalyst system, preferably a supported catalyst system, most preferably a supported bulky ligand metallocene-type catalyst system under ambient temperatures and pressures. Preferably the contact temperature for combining the polymerization catalyst and the carboxylate metal salt is in the range of from 0° C. to about 100° C., more preferably from 15° C. to about 75° C., most preferably at about ambient temperature and pressure.

In a preferred embodiment, the contacting of the polymerization catalyst and the carboxylate metal salt is performed under an inert gaseous atmosphere, such as nitrogen. However, it is contemplated that the combination of the polymerization catalyst and the carboxylate metal salt may be performed in the presence of olefin(s), solvents, hydrogen and the like.

In one embodiment, the carboxylate metal salt may be added at any stage during the preparation of the polymerization catalyst.

In one embodiment of the method of the invention, the polymerization catalyst and the carboxylate metal salt are combined in the presence of a liquid, for example the liquid may be a mineral oil, toluene, hexane, isobutane or a mixture thereof. In a more preferred method the carboxylate metal salt is combined with a polymerization catalyst that has been formed in a liquid, preferably in a slurry, or combined with a substantially dry or dried, polymerization catalyst that has been placed in a liquid and reslurried.

In an embodiment, the contact time for the carboxylate metal salt and the polymerization catalyst may vary depending on one or more of the conditions, temperature and pressure, the type of mixing apparatus, the quantities of the components to be combined, and even the mechanism for introducing the polymerization catalyst/carboxylate metal salt combination into the reactor.

Preferably, the polymerization catalyst, preferably a bulky ligand metallocene-type catalyst compound and a carrier, is contacted with a carboxylate metal salt for a period of time from about a second to about 24 hours, preferably from about 1 minute to about 12 hours, more preferably from about 10 minutes to about 10 hours, and most preferably from about 30 minutes to about 8 hours.

In an embodiment, the ratio of the weight of the carboxylate metal salt to the weight of the transition metal of the catalyst compound is in the range of from about 0.01 to about 1000, preferably in the range of from 1 to about 100, more preferably in the range of from about 2 to about 50, and most preferably in the range of from 4 to about 20. In one embodiment, the ratio of the weight of the carboxylate metal salt to the weight of the transition metal of the catalyst compound is in the range of from about 2 to about 20, more preferably in the range of from about 2 to about 12, and most preferably in the range of from 4 to about 10.

In another embodiment of the method of the invention, the weight percent of the carboxylate metal salt based on the total weight of the polymerization catalyst is in the range of from about 0.5 weight percent to about 500 weight percent, preferably in the range of from 1 weight percent to about 25 weight percent, more preferably in the range of from about 2 weight percent to about 12 weight percent, and most preferably in the range of from about 2 weight percent to about 10 weight percent. In another embodiment, the weight percent of the carboxylate metal salt based on the total weight of the polymerization catalyst is in the range of from 1 to about 50 weight percent, preferably in the range of from 2 weight percent to about 30 weight percent, and most preferably in the range of from about 2 weight percent to about 20 weight percent.

In one embodiment, where the process of the invention is producing a polymer product having a density greater than 0.910 g/cc, the total weight percent of the carboxylate metal salt based on the total weight of the polymerization catalyst is greater than 1 weight percent. In yet another embodiment, where the process of the invention is producing a polymer product having a density less than 0.910 g/cc, the total weight percent of the carboxylate metal salt based on the total weight of the polymerization catalyst is greater than 3 weight percent. If the polymerization catalyst includes a carrier, the total weight of the polymerization catalyst includes the weight of the carrier.

It is believed that the more metal of the activator, for example total aluminum content or free aluminum content (the alkyl aluminum content in alumoxane), present in the polymerization catalyst, the more carboxylate metal salt is required. Manipulating the amounts or loadings of the polymerization catalyst components, i.e. the free aluminum may provide a means for adjusting the level of carboxylate metal salt.

Mixing techniques and equipment contemplated for use in the method of the invention are well known. Mixing techniques may involve any mechanical mixing means, for example shaking, stirring, tumbling, and rolling. Another technique contemplated involves the use of fluidization, for example in a fluid bed reactor vessel where circulated gases provide the mixing. Non-limiting examples of mixing equipment for combining, in the most preferred embodiment a solid polymerization catalyst and a solid carboxylate metal salt, include a ribbon blender, a static mixer, a double cone blender, a drum tumbler, a drum roller, a dehydrator, a fluidized bed, a helical mixer and a conical screw mixer.

In an embodiment of the method of the invention, a supported conventional-type transition metal catalyst, preferably a supported bulky ligand metallocene-type catalyst, is tumbled with a carboxylate metal salt for a period of time such that a substantial portion of the supported catalyst is intimately mixed and/or substantially contacted with the carboxylate metal salt.

In a preferred embodiment of the invention the catalyst system of the invention is supported on a carrier, preferably the supported catalyst system is substantially dried, preformed, substantially dry and/or free flowing. In an especially preferred method of the invention, the preformed supported catalyst system is contacted with at least one carboxylate metal salt. The carboxylate metal salt may be in solution or slurry or in a dry state, preferably the carboxylate metal salt is in a substantially dry or dried state. In the most preferred embodiment, the carboxylate metal salt is contacted with a supported catalyst system, preferably a supported bulky ligand metallocene-type catalyst system in a rotary mixer under a nitrogen atmosphere, most preferably the mixer is a tumble mixer, or in a fluidized bed mixing process, in which the polymerization catalyst and the carboxylate metal salt are in a solid state, that is they are both substantially in a dry state or in a dried state.

In an embodiment of the method of the invention a conventional-type transition metal catalyst compound, preferably a bulky ligand metallocene-type catalyst compound, is contacted with a carrier to form a supported catalyst compound. In this method, an activator or a cocatalyst for the catalyst compound is contacted with a separate carrier to form a supported activator or supported cocatalyst. It is contemplated in this particular embodiment of the invention, that a carboxylate metal salt is then mixed with the supported catalyst compound or the supported activator or cocatalyst, in any order, separately mixed, simultaneously mixed, or mixed with only one of the supported catalyst, or preferably the supported activator prior to mixing the separately supported catalyst and activator or cocatalyst.

As a result of using the combination of polymerization catalyst/carboxylate metal salt of the invention it may be necessary to improve the overall catalyst flow into the reactor. Despite the fact that the catalyst flow is not as good as a catalyst without the carboxylate metal salt, the flowability of the catalyst/carboxylate combination of the invention was not a problem. If catalyst flow needs improvement, it is well known in the art to use bin vibrators, or catalyst feeder brushes and feeder pressure purges and the like.

In another embodiment, the polymerization catalyst/ carboxylate metal salt may be contacted with a liquid, such as mineral oil and introduced to a polymerization process in a slurry state. In this particular embodiment, it is preferred that the polymerization catalyst is a supported polymerization catalyst.

In some polymerization processes smaller particle size support materials are preferred. However, the operability of these processes is more challenging. It has been discovered that utilizing the polymerization catalyst and carboxylate metal salt combination of the invention, smaller particle size support materials may be used successfully. For example, silica having an average particle size from about 10 microns to 80 microns. Silica materials of this size are available from Crosfield Limited, Warrington, England, for example Crosfield ES-70 having an average particle size of 35 to 40 microns. Not wishing to bound by any theory, it is traditionally believed that using smaller average particle size supports produces more fines and results in a more sheeting prone supported catalyst. It is also believed that the use of a carboxylate metal salt with the polymerization catalyst provides for better particle growth during polymerization. This better particle morphology is believed to result in fewer fines and a reduced tendency for sheeting to occur. Thus, the use of a carboxylate metal salt allows for the use of a smaller support material.

In an embodiment, the method of the invention provides for co-injecting an unsupported polymerization catalyst and a carboxylate metal salt into the reactor. In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with a carboxylate metal salt to a reactor using the injection methods described in PCT publication WO 97/46599, which is fully incorporated herein by reference.

Where a carboxylate metal salt and an unsupported bulky ligand metallocene-type catalyst system combination is utilized, the mole ratio of the metal of the activator component to the metal of the bulky ligand metallocene-type catalyst compound is in the range of between 0.3:1 to 10,000:1, preferably 100:1 to 5000:1, and most preferably 500:1 to 2000:1.

Polymerization Process

The catalysts and catalyst systems of the invention described above are suitable for use in any polymerization process. Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbomene, norbomadiene, isobutylene, vinylbenzocyclobutane, styrenes, alkyl substituted styrene, ethylidene norbomene, isoprene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a process, particularly a gas phase or slurry phase process, for polymerizing propylene alone or with one or more other monomers including ethylene, and olefins having from 4 to 12 carbon atoms. Polypropylene polymers may be produced using particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202, EP-A2 0 891 990 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference.

A preferred process of the invention is where the process, preferably a slurry or gas phase process is operated in the presence of a bulky ligand-metallocene-type catalyst system and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543 which are herein fully incorporated by reference. However, it has been discovered that a polymerization process utilizing the catalyst system/carboxylate metal salt combination of the invention may be operated with a small amount of scavenger with reduced or no effect on process operability and catalyst performance. Thus, in one embodiment, the invention provides a process for polymerizing olefin(s) in a reactor in the presence of a bulky ligand metallocene-type catalyst system, a carboxylate metal salt and a scavenger.

In one embodiment, the polymerization catalyst and/or catalyst composition, the polymerization catalyst and the carboxylate metal salt have a productivity greater than 1500 grams of polymer per gram of catalyst, preferably greater than 2000 grams of polymer per gram of catalyst, more preferably greater than 2500 grams of polymer per gram of catalyst and most preferably greater than 3000 grams of polymer per gram of catalyst.

In another embodiment, the polymerization catalyst and/or catalyst composition, the polymerization catalyst and the carboxylate metal salt, have a productivity greater than 2000 grams of polymer per gram of catalyst, preferably greater than 3000 grams of polymer per gram of catalyst, more preferably greater than 4000 grams of polymer per gram of catalyst and most preferably greater than 5000 gram s of polymer per gram of catalyst.

In one embodiment, the polymerization catalyst and/or the catalyst composition has a reactivity ratio generally less than 2, more typically less than 1. Reactivity ratio is defined to be the mole ratio of comonomer to monomer entering the reactor, for example as measured in the gas composition in a gas phase process, divided by the mole ratio of the comonomer to monomer in the polymer product being produced. In a preferred embodiment, the reactivity ratio is less than 0.6, more preferably less than 0.4, and most preferably less than 0.3. In the most preferred embodiment, the monomer is ethylene and the comonomer is an olefin having 3 or more carbon atoms, more preferably an alpha-olefin having 4 or more carbon atoms, and most preferably an alpha-olefin selected from the group consisting of butene-1, 4-methyl-pentene-1, pentene-1, hexene-1 and octene-1.

In another embodiment of the invention, when transitioning from a first polymerization catalyst to a second polymerization catalyst, preferably where the first and second polymerization catalysts are bulky ligand metallocene-type catalyst compound, more preferably where the second polymerization catalyst is a bridged, bulky ligand metallocene-type catalyst compound, it would be preferable during the transition to use a catalyst composition of a carboxylate metal salt combined with a bridged, bulky ligand metallocene-type catalyst.

When starting up a polymerization process, especially a gas phase process, there is a higher tendency for operability problems to occur. Thus, it is contemplated in the present invention that a polymerization catalyst and carboxylate metal salt mixture is used on start-up to reduce or eliminate start-up problems. Furthermore, it also contemplated that once the reactor is operating in a stable state, a transition to the same or a different polymerization catalyst without the carboxylate metal salt can be made.

In another embodiment, during a polymerization process that is or is about to be disrupted, a polymerization catalyst/carboxylate metal salt mixture of the invention could be transitioned to. This switching of polymerization catalysts is contemplated to occur when operability problems arise. Indications of operability problems are well known in the art. Some of which in a gas phase process include temperature excursions in the reactor, unexpected pressure changes, excessive static generation or unusually high static spikes, chunking, sheeting and the like. In an embodiment, the carboxylate metal salt may be added directly to the reactor, particularly when operability problems arise.

It has also been discovered that using the polymerization catalyst combined with a carboxylate metal salt of the invention it is easier to produce fractional melt index and higher density polymers. In one embodiment, the invention provides for a process for polymerizing olefin(s) in a reactor in the presence of a polymerization catalyst in combination with a carboxylate metal salt to produce a polymer product having a melt index less than about 1 dg/min and a density greater than 0.920 g/cc, more preferably the polymer product has a melt index less than about 0.75 dg/min and a density greater than 0.925 g/cc. Preferably the polymerization catalyst is a bulky ligand metallocene-type catalyst, more preferably the process is a gas phase process and the polymerization catalyst includes a carrier.

It is contemplated that using the combination polymerization catalyst/carboxylate metal salt of the invention, transitioning to one of the more difficult grades of polymers would be simpler. Thus, in one embodiment, the invention is directed to a process for polymerizing olefin(s) in the presence of a first catalyst composition, under steady state conditions, preferably gas phase process conditions, to produce a first polymer product. The first polymer product having a density greater than 0.87 g/cc, preferably greater than 0.900 g/cc, more preferably greater than 0.910 g/cc, and a melt index in the range of from 1 dg/min to about 200 dg/min, preferably in the range of greater than 1 dg/min to about 100 dg/min, more preferably from greater than 1 dg/min to about 50 dg/min, most preferably from greater than 1 dg/min to about 20 dg/min. This process further comprises the step of transitioning to a second catalyst composition to produce second polymer product having a density greater than 0.920 g/cc, preferably greater than 0.925 g/cc, and a melt index less than 1 dg/min, preferably less than 0.75 dg/min. The second catalyst composition comprising, in combination, a conventional-type transition metal catalyst and/or a bulky ligand metallocene-type catalyst, and a carboxylate metal salt. It is also within the scope of this particular embodiment to transition from a first polymer product having an $I_{21}/I_2$ (described below) of less than 25 to a second polymer product having an $I_{21}/I_2$ greater than 25, preferably greater than 30, and even more preferably greater than 35.

In yet another embodiment, the process of the invention involves alternating between a first catalyst composition comprising a first polymerization catalyst/carboxylate metal salt mixture and a catalyst composition of a second polymerization catalyst without a carboxylate metal salt to improve the overall process operability. In a further embodiment, the first and second catalyst compositions described above can be used simultaneously, for example as a mixture or injected into a reactor separately. In any of these embodiment, the first and second polymerization catalysts may be the same or different.

Polymer Product of the Invention

The polymers produced by the process of the invention can be used in a wide variety of products and end-use applications. The polymers produced by the process of the invention include linear low density polyethylene, elastomers, plastomers, high density polyeth'ylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8. The ratio of $M_w/M_n$ can be measured by gel permeation chromatography techniques well known in the art.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993 which is fully incorporated herein by reference.

The bulky ligand metallocene-type catalyzed polymers of the invention in one embodiment have CDBI's generally in the range of greater than 50% to 99%, preferably in the range of 55% to 85%, and more preferably 60% to 80%, even more preferably greater than 60%, still even more preferably greater than 65%.

In another embodiment, polymers produced using a conventional-type transition metal catalyst have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in one embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65.

In yet another embodiment, propylene based polymers are produced in the process of the invention. These polymers include atactic polypropylene, isotactic polypropylene, and syndiotactic polypropylene. Other propylene polymers include propylene random, block or impact copolymers.

Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The properties of the polymer were determined by the following test methods:

Density is measured in accordance with ASTM-D-1238.

The Fouling Index in the Tables below illustrates operability of the catalyst. The higher the value the greater the fouling observed. A Fouling Index of zero means substantially no or no visible fouling. A Fouling Index of 1 is indicative of light fouling, where a very light partial coating of polymer on the stirrer blades of a 2 liter slurry isobutane polymerization reactor and/or no reactor body sheeting. A Fouling Index of 2 is indicative of more than light fouling, where the stirrer blades have a heavier, painted-like, coating of polymer and/or the reactor body wall has some sheeting in a band of 1 to 2 inches (2.54 to 5.08 cm) wide on the reactor wall. A Fouling Index of 3 is considered medium fouling, where the stirrer blade has a thicker, latex-like, coating of polymer on the stirrer blade, some soft chunks in the reactor, and/or some reactor body sheeting with a band of 2 to 3 inch (5.08 to 7.62 cm) wide on the reactor wall. A Fouling Index of 4 is evidence of more than medium fouling, where the stirrer has a thick, latex-like, coating, some harder chunks/balls of polymer, and/or the reactor body wall sheeting band is from 3 to 4 inches (7.62 to 10.2 cm) wide.

Activity in the Tables below is measured in grams of polyethylene(PE) per gram of polymerization catalyst-hour (gPE/gCat.h).

Comparative Example 1
Preparation of Catalyst A

The bridged, bulky ligand metallocene-type catalyst compound used in this Comparative Example 1 is a dimethylsilyl-bis(tetrahydroindenyl)zirconium dichloride ($Me_2Si(H_4Ind)_2ZrCl_2$) available from Albemarle Corporation, Baton Rouge, La. The ($Me_2Si(H_4Ind)_2ZrCl_2$) catalyst compound was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

The first step in the manufacture of the supported bulky ligand metallocene-type catalyst above involves forming a precursor solution. 460 lbs (209 kg) of sparged and dried toluene is added to an agitated reactor after which 1060 lbs (482 kg) of a 30 weight percent methylaluminoxane (MAO) in toluene (available from Albemarle, Baton Rouge, La.) is added. 947 lbs (430 kg) of a 2 weight percent toluene solution of a dimethylsilyl-bis(tetrahydroindenyl) zirconium dichloride catalyst compound and 600 lbs (272 kg) of additional toluene are introduced into the reactor. The precursor solution is then stirred at 80° F. to 100° F. (26.7° C. to 37.8° C.) for one hour.

While stirring the above precursor solution, 850 lbs (386 kg) of 600 C Crosfield dehydrated silica carrier is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl) octadecylamine (($Cl_8H_{37}N(CH_2CH_2OH)_2$) available as Kemamine AS-990 from Witco Corporation, Memphis, Tenn., is added together with an additional 110 lbs (50 kg) of a toluene rinse and the reactor contents then is mixed for 30 min. while heating to 175° F. (79° C.). After 30 min. vacuum is applied and the polymerization catalyst mixture dried at 175° F. (79° C.) for about 15 hours to a free flowing powder. The final polymerization catalyst weight was 1200 lbs (544 kg) and had a Zr wt % of 0.35 and an Al wt % of 12.0.

Example 1
Preparation of Catalyst B

A 1 kg sample of the polymerization catalyst prepared as described in Comparative Example 1, Catalyst A, was weighed into a 3-liter glass flask under an inert atmosphere. 40 g of Witco Aluminum Stearate #22 (AlSt #22) ($CH_3(CH_2)_{16}COO)_2Al$—OH available from Witco Corporation, Memphis, Tenn., was dried under vacuum at 85° C. and was added to the flask and the contents tumbled/mixed for 20 minutes at room temperature. The aluminum stearate appeared to be homogeneously dispersed throughout the catalyst particles.

Example 2
Preparation of Catalyst C

A 1 kg sample of the polymerization catalyst prepared as described in Comparative Example 1, Catalyst A, was weighed into a 3-liter glass flask under an inert atmosphere. 20 g of Witco Aluminum Stearate #22 (AlSt #22) ($CH_3(CH_2)_{16}COO)_2Al$—OH available from Witco Corporation, Memphis, Tenn., was dried under vacuum at 85° C. and was added to the flask and the contents tumbled/mixed for 20 minutes at room temperature. The aluminum stearate appeared to be homogeneously dispersed throughout the catalyst particles.

Example 3
Preparation of Catalyst D

A 1 kg sample of the polymerization catalyst prepared as described in Comparative Example 1, Catalyst A, was weighed into a 3-liter glass flask under an inert atmosphere. 10 g of Witco Aluminum Stearate #22 (AlSt #22) ($CH_3(CH_2)_{16}COO)_2Al$—OH available from Witco Corporation, Memphis, Tenn., was dried under vacuum at 85° C. and was added to the flask and the contents tumbled/mixed for 20 minutes at room temperature. The aluminum stearate appeared to be homogeneously dispersed throughout the catalyst particles.

Polymerization Process Using Catalyst A through D

A 2 liter autoclave reactor under a nitrogen purge was charged with 0.16 mmoles triethylaluminum (TEAL), followed by 20 cc of hexene-1 comonomer and 800 cc of isobutane diluent. The contents of the reactor were heated to 80° C., after which, 100 mg of each of the supported polymerization catalysts above, Catalyst A, B, C and D, were each separately polymerized as follows: Each polymerization catalyst was introduced concurrently with ethylene into the reactor to make up a total reactor pressure of 325 psig (2240 kPa). The reactor temperature was maintained at 85° C. and the polymerization was allowed to proceed for 40 min. After 40 minutes the reactor was cooled, ethylene was vented off and the polymer dried and weighed to obtain the polymer yield. Table 1 below provides the yield activity data, as well as the fouling characteristics observed using Catalyst A with no aluminum stearate and Catalyst B through D, each with various levels of aluminum stearate.

TABLE 1

| Example | Catalyst | AlSt Amount (g) | Activity (g PE/g Cat.h) | Fouling Index |
|---|---|---|---|---|
| Comparative 1 | A | 0 | 1845 | 2.0 |
| 1 | D | 10 | 1680 | 1.5 |
| 2 | C | 20 | 1710 | 0 |
| 3 | B | 40 | 1650 | 0 |

Table 1 illustrates the effect of various levels of aluminum stearate on catalyst activity and operability.

Comparative Example 2

Preparation of Catalyst E

Into a 2 gallon (7.57 liters) reactor was charged first with 2.0 liters of toluene then, 1060 g of 30 wt % methylalumoxane solution in toluene (available from Albemarle, Baton Rouge, La.), followed by 23.1 g of bis(1,3-methyl-n-butyl cyclopentadienyl) zirconium dichloride as a 10% solution in toluene. The mixture was stirred for 60 minutes at room temperature after which 850 g of silica (Davison 948 dehydrated at 600° C. available from W.R. Grace, Davison Chemical Division, Baltimore, Md.) was added to the liquid with slow agitation. Stirring speed was increased for approximately 10 minutes to insure dispersion of the silica into the liquid and then appropriate amount of toluene was added to make up a slurry of liquid to solid having a consistency of 4 cc/g of silica. Mixing was continued for 15 minutes at 120 rpm after which 6 g of Kemamine AS-990 (available Witco Corporation, Memphis, Tenn.) was dissolved in 100 cc of toluene and was added and stirred for 15 minutes. Drying was then initiated by vacuum and some nitrogen purge at 175° F. (79.4° C.). When the polymerization catalyst comprising the carrier, silica, appeared to be free flowing, it was cooled down and discharged into a nitrogen purged vessel. An approximate yield of 1 Kg of dry polymerization catalyst was obtained due to some loses due to drying.

Example 4

Preparation of Catalyst F

A sample of the polymerization catalyst prepared as described in Comparative Example 2, Catalyst E, was dry blended with an amount of Witco Aluminum Stearate #22 (AlSt #22) (available from Witco Corporation, Memphis, Tenn.) equal to 2 weight percent based on the total weight of the supported polymerization catalyst. The AlSt #22 was dried in a vacuum oven for 12 hours at 85° C. Under nitrogen, the polymerization catalyst was then dry blended with the AlSt #22. Table 2 illustrates the benefits of adding the carboxylate metal salt in these examples, aluminum stearate, to the polymerization catalyst. These examples also show that the carboxylate metal salt has virtually no effect on the molecular weight properties of the polymer formed.

The results of the polymerization runs for Catalysts E and F using the same process as previously described above for Catalysts A through D are shown below in Table 2.

TABLE 2

| Example | Catalyst | Amount AlSt | Activity (g PE/g Cat.h) | Fouling Index | MI (dg/min) | MIR ($I_{21}/I_2$) |
|---|---|---|---|---|---|---|
| Comp. (2) | E | 0 | 1980 | 1.0 | 0.15 | 19.8 |
| 4 | F | 2 wt % | 1950 | 0 | 0.18 | 18.0 |

Comparative Example 3

Preparation of Catalyst G

Into a 2 gallon (7.57 liters) reactor was charged 1060 g of 30 wt % methylalumoxane (MAO), an activator, solution in toluene (PMAO, modified MAO available from Akzo Nobel, LaPorte, Tex.), followed by 1.5 liter of toluene. While stirring 17.3 g of bis(1,3-methyl-n-butylcyclopentadienyl) zirconium dichloride, a bulky ligand metallocene-type catalyst compound, as an 8 wt % solution in toluene was added to the reactor and the mixture was stirred for 60 min at room temperature to form a catalyst solution. The content of the reactor was unloaded to a flask and 850 g of silica dehydrated at 600° C. (available from Crosfield Limited, Warrington, England) was charged to the reactor. The catalyst solution contained in the flask was then added slowly to the silica carrier in the reactor while agitating slowly. More toluene (350 cc) was added to insure a slurry consistency and the mixture was stirred for an additional 20 min. 6 g of Kemamine AS-990 (available from Witco Corporation, Memphis, Tenn.) as a 10% solution in toluene was added and stirring continued for 30 min. at room temperature. The temperature was then raised to 68° C. (155° F.) and vacuum was applied in order to dry the polymerization catalyst. Drying was continued for approximately 6 hours at low agitation until the polymerization catalyst appeared to be free flowing. It was then discharged into a flask and stored under a $N_2$ atmosphere. The yield was 1006 g due to some losses in the drying process. Analysis of the polymerization catalyst was: Zr=0.30 wt %, Al=11.8 wt %.

Examples 5 and 6

In Examples 5 and 6, the polymerization catalyst prepared as described in Comparative Example 3, Catalyst G, was coinjected with 4 weight percent and 8 weight percent Witco Aluminum Stearate #22, (AlSt #22) (available from Witco Corporation, Memphis, Tenn.) based on the catalyst charge and injected into a polymerization reactor. The results of the polymerization runs using Catalysts G, H and I in the same process as previously described for Catalysts A through D are shown in Table 3.

TABLE 3

| Example | Catalyst | AlSt (wt %) | Activity (g PE/g Cat.h) | MI ($I_2$) (dg/min) | MIR ($I_{21}/I_2$) | Fouling Index |
|---|---|---|---|---|---|---|
| Comp. (3) | G | 0 | 2535 | 0.13 | 21.4 | 4.0 |
| 5 | H | 4 | 2250 | 0.12 | 22.5 | 0 |
| 6 | I | 8 | 2010 | 0.12 | 22.5 | 0 |

Table 3 illustrates that even with a highly active, more fouling prone catalyst, aluminum stearate is effective. It further illustrates that aluminum stearate does not materially change the product characteristics.

Examples 7 though 11

Examples 7 and 8 use the same catalyst from Comparative Example 3, Catalyst G, with Calcium Stearate (CaSt) (Catalyst J) as the carboxylate metal salt in Example 7 and Zinc Stearate (ZnSt) (Catalyst K) in Example 8. The CaSt and ZnSt is available from Mallinkrodt Corporation, Phillipsbury, N.J. The polymerization process used for testing the catalyst compositions of Examples 7 and 8 is the same as that described and used above for Catalyst A through D.

Examples 9 through 11 use the same catalyst from Comparative Example 1, Catalyst A, with aluminum mono-stearate (Example 9, Catalyst L) as the carboxylate metal salt, aluminum di-stearate (Example 10, Catalyst M) and aluminum tri-stearate (Example 11, Catalyst N). The polymerization process later described herein and used in Examples 12 through 15 was used to test the catalyst compositions of Examples 9 through 11, Catalysts L, M and N Table 4 below provides these results.

TABLE 4

| Example | Catalyst | Carboxylate Metal Salt | Amount of Carboxylate (wt %) | Activity (g PE/ g cat.h) | Fouling Index |
|---|---|---|---|---|---|
| Comp. (3) | G | None | 0 | 2535 | 4.0 |
| 7 | J | CaSt | 2 | 2295 | 2.0 |
| 8 | K | ZnSt | 4 | 2340 | 3.0 |
| Comp. (1) | A | None | 0 | 1845 | 2.0 |
| 9 | L | Al mono-Stearate | 5 | NA | 0 |
| 10 | M | Al di-Stearate | 5 | NA | 0 |
| 11 | N | Al tri-Stearate | 5 | NA | 0.5 |

Examples 7 and 8 illustrate the use of different carboxylate metal salts. Specifically in Examples 7 and 8, the metal of the stearate, Ca and Zn, are shown to be effective in reducing fouling. Examples 9, 10 and 11 illustrate several types of carboxylate aluminum salts, specifically that different forms of aluminum stearate are effective. From the data in Table 4 it can be seen that mono-stearates and di-stearates are most effective.

Examples 12 through 15

In Examples 12 through 15 the dry blending method described in Example 1 was used with Catalyst A of Comparative Example 1 with various types of carboxylate metal salts. The quantity and type of carboxylate metal salt is set out in Table 5. The following polymerization process described below was used for each polymerization catalyst/carboxylate metal salt combination, Catalysts O, P, Q and R.

Polymerization Process for Examples 12 through 15

A 2 liter autoclave reactor under a nitrogen purge was charged with 0.16 mmoles triethylaluminum (TEAL), followed by 25 cc of hexene-1 comonomer and 800 cc of isobutane diluent. The contents of the reactor were heated to 80° C., after which, 100 mg of each of the supported polymerization catalysts/carboxylate metal salt mixture described above, (Catalyst A with the specified amounts of carboxylate metal salt as reported in Table 5), were each separately polymerized as follows: Each polymerization catalyst/carboxylate metal salt combination was introduced concurrently with ethylene into the reactor to make up a total reactor pressure of 325 psig (2240 kPa). The reactor temperature was maintained at 85° C. and the polymerization was allowed to proceed for 40 min. After 40 minutes the reactor was cooled, ethylene was vented off and the polymer dried and weighed to obtain the polymer yield.

The results are given in Table 5 below. Of particular interest, these Examples 12, 13, 14, and 15 illustrate a preference for having a bulky R-group on the carboxylate metal salts, specifically, the aluminum carboxylates.

TABLE 5

| Example | Catalyst | Carboxylate Metal Salt | Amount of Carboxylate (wt %) | Fouling Index |
|---|---|---|---|---|
| 12 | O | Al Acetate | 5.0 | 4 |
| 13 | P | Al Octoate | 5.0 | 3 |
| 14 | Q | Al Naphthenate | 5.0 | 2 |
| 15 | R | Al Oleate | 5.0 | 0 |

Examples 16 through 18 and Comparative Example 4

Examples 16, 17 and 18 and Comparative Example 4 illustrate the effectiveness of the use of a carboxylate metal salt, particularly aluminum stearate, in a fluid bed gas phase process in combination with a bulky ligand metallocene-type catalyst system to produce grades of polymer that are typically more difficult to produce especially in terms of operability. Traditionally, fractional melt index and higher density grades are difficult to make from a reactor operability standpoint. The polymerization catalyst used in the polymerizations of Examples 16, 17 and 18 and Comparative Example 4 were run in the process described below and the results of which are indicated in Table 6 below.

Polymerization Process

The Catalysts A, B and F described above were then separately tested in a continuous gas phase fluidized bed reactor which comprised a nominal 18 inch, schedule 60 reactor having an internal diameter of 16.5 inches. (41.9 cm) The fluidized bed is made up of polymer granules. The gaseous feed streams of ethylene and hydrogen together with liquid comonomer were mixed together in a mixing tee arrangement and introduced below the reactor bed into the recycle gas line. Hexene-1 was used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain constant hydrogen to ethylene mole ratio. The concentration of all the gases were measured by an on-line gas chromatograph to ensure relatively constant composition in the recycle gas stream. The solid supported bulky ligand metallocene-type catalyst system listed in Table 6, was injected directly into the fluidized bed using purified nitrogen at 1.5 lbs/hr (0.68 kg/hr). The reacting bed of growing polymer particles was maintained in a fluidized state by the continuous flow of the make up feed and recycle gas through the reaction zone. A superficial gas velocity of 1 to 3 ft/sec (30.5 cm/sec to 91.4 cm/sec) was used to achieve this. The reactor was operated at a total pressure of 300 psig (2069 kPa), a reactor temperature of 85° C. and a superficial gas velocity of 2.25 ft/sec (68.6 cm/sec) was used to achieve fluidization of the granules. To maintain a constant reactor temperature, the temperature of the recycle gas is continuously adjusted up or down to accommodate any changes in the rate of heat generation due to the polymerization. The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst.

TABLE 6

| EXAMPLE | 16 | 17 | 18 | Comp. 4 |
|---|---|---|---|---|
| BTO's | 9 | 10 | 8 | 3 |
| Catalyst | B | F | F | A |
| Cat. Activity[1] | 4300 | 4000 | 3300 | 4800 |
| MI (dg/min) | 0.78 | 0.73 | 0.43 | 1.47 |
| Density (g/cc) | 0.9243 | 0.9248 | 0.9230 | 0.9188 |
| Resin bulk density (g/cc) | 0.49 | 0.44 | 0.45 | 0.48 |

[1]Pounds of Polymer per Pound of polymerization catalyst.

By using carboxylate metal salts in combination with the polymerization catalysts, reactor operability improves tremendously. Table 6 illustrates a gas phase reactor operating without any problems in producing fractional melt index polymers for many bed turnovers (BTO). Specifically shown is that using a polymerization catalyst without the carboxylate metal salt, as in Comparative Example 4 (without aluminum stearate), the reactor was shut down due to fouling and sheeting in less than 3 bed turnovers at around a melt index of 1.5 dg/min and a density of 0.9188 g/cc. In an embodiment of the invention the process is operating for a period greater than 4 bed turnovers, more preferably greater than 5 bed turnovers and most preferably greater than 6 bed turnovers. A bed turnover is when the total weight of the polymer discharged from the reactor is approximately equal or equal to the bed weight in the reactor.

It is known in the art that reducing resin bulk density can improve operability of a polymerization process, particularly a gas phase fluidized bed polymerization process. Note from Table 6 that the resin bulky density did not change much, however, the operability of the process of the invention was surprisingly, substantially improved, when a carboxylate metal salt is combined with the polymerization catalyst.

Example 19
Preparation of a Conventional-type Transition Metal Catalyst

A conventional-type transition metal catalyst was prepared from a mixture of generally a magnesium compound, for example $MgCl_2$, a titanium compound, for example $TiCl_3 \cdot 1/3 AlCl_3$, and an electron donor, for example tetrahydrofuran (THF), and was supported on silica that was dehydrated at 600° C. A detailed description of the preparation procedure can be found in U.S. Pat. No. 4,710,538, which is herein incorporated by reference. The specific catalyst formulation used had a TNHAL/THF mole ratio of 29 and a DEAC/THF mole ratio of 26 where TNHAL is tri-n-hexyl aluminum and DEAC is diethyl aluminum chloride.

Polymerization Process Using the Conventional-type Transition Metal Catalyst

The dry, free flowing catalyst, described above, was injected into a continuous gas phase fluid bed reactor which comprised a nominal 18-inch (45.7 cm), schedule 60 reactor, having an internal diameter of 16.5 inches (41.9 cm), as described previously in this patent specification. The same process and conditions as previously described were used. However, in this process, a 5 weight percent triethylaluminum (TEAL), a conventional-type cocatalyst, solution in hexane was continuously added to the reactor to maintain a TEAL concentration in the fluid bed of approximately 300 ppm. Also, the solid conventional-type transition metal catalyst prepared as described directly above was injected directly into the fluidized bed, see Table 7, Run A.

A solution of a carboxylate metal salt, Witco Aluminum Stearate #22 (AlSt #22) in hexane (2000 ppm) was prepared. During the polymerization process, see Table 7, Run A, the solution was pumped into the gas phase reactor, see the results in Table 7, Run B. The catalyst productivity by material balance remained virtually the same even after the addition of aluminum stearate. Moreover, in this example, operability of the reactor remained stable and continued for more than 4 bed turnovers before the run was voluntarily terminated.

TABLE 7

| Run | A | B |
|---|---|---|
| AlSt #22 (ppm) | 0 | 12.2 |
| Cat Bulk Den (g/cc) | 0.537 | 0.537 |
| TEAL Feed (ppm) | 307 | 313 |
| Catalyst Productivity[1] | 2,947 | 2,836 |
| MI (g/10 min) | 13.25 | 13.10 |
| MIR (HLMI/MI) | 31.03 | 27.21 |
| Density (g/cc) | 0.9348 | 0.9318 |
| Bulk Density (g/cc) | 0.3860 | 0.3834 |
| APS (microns) | 523 | 523 |

[1]grams of polymer per gram of catalyst

The above example illustrates that the using a carboxylate metal salt in conjunction with a conventional-type transition metal catalyst system the operability in a continuous gas phase polymerization process does not deteriorate, particularly where the carboxylate metal salt is introduced separately from the conventional-type catalyst system. However, in some batch polymerization slurry runs it was found that using Witco Aluminum Stearate EA grade dry blended with a conventional-type titanium metal catalyst resulted in a reduction in productivity. Without being bound to any particular theory, it is believed that the reduction in productivity may be partly due to the aluminum stearate reacting with the conventional-type cocatalyst, triethylaluminum for example, resulting in less active cocatalyst in the batch reactor.

Examples 20 and 21 below illustrate the use of a conventional-type chromium metal catalyst dry blended with a carboxylate metal salt.

Example 20
Preparation of a Conventional-type Chromium Metal Catalyst

A conventional-type chromium metal catalyst, also known as a Phillips-Type catalyst, was prepared using Crosfield EP510 catalyst (1 wt % Titanium and 0.5 wt % Chromium—from chromium acetylacetonate) available from Crosfield Limited, Warrington, England. The EP 510 catalyst was activated at 800° C. with 70% oxygen/30% nitrogen in a fluidized bed column as is known in the art and was used in the following polymerization process.

Comparative Example 20A
Homopolymerization Process of Ethylene $100\mu$ mole of triethylaluminum (25 weight percent TEAL solution in heptane) was added to a 2.2 liter autoclave reactor as a scavenger to remove trace impurities in the vessel. Polymerization grade isobutane 800 ml available from Phillips Petroleum, Bartlesville, Okla., was added to the reactor. The contents were stirred at 1000 rpm and the reactor temperature was raised from ambient to 93° C. and then ethylene was introduced to the reactor until the total reactor pressure was 375 psig (2586 kPag).

300 mg of the activated chromium catalyst prepared above in Example 20 was then charged to the reactor and ethylene polymerization proceeded for about 60 minutes at which point the reaction was terminated by venting hydrocarbons from the reactor. In this Comparative Example 20A the chromium catalyst as described above was used neat (without aluminum stearate) and resulted in a highly charged, staticky, polymer. A hexane solution of antistatic agent Kemamine AS-990 had to be used to remove the staticky polymer from reactor walls. The total resin collected was about 245 grams.

Example 20B

In this example, the polymerization catalyst included 300 mg of activated chromium catalyst (prepared as described above in Example 20) dry-blended with 15 mg of aluminum stearate, Witco Aluminum Stearate EA grade, prior to the polymerization. The polymerization catalyst was then charged to the reactor under the same polymerization conditions as described above in Comparative Example 20A. After about 60 minutes, the polymerization was stopped and the reactor was inspected. The resin produced was not staticky and the polymer was easily removed from the reactor. The resin yield was 133 grams. This run demonstrated that a carboxylate metal salt, an aluminum stearate compound, either prevents or neutralizing the charges on the resin made with a conventional-type chromium metal catalyst system. It is a general belief that the reactor-sheeting phenomenon in gas phase ethylene polymerization using chromium catalyst is related to the static charge in the system.

Example 21

Copolymerization Process

50 $\mu$ mole of triethylaluminum was added to the reactor as a scavenger to remove trace impurities in the vessel. Thereafter, 50 ml of purified hexene-1 comonomer and 800 ml of isobutane were added to the reactor. After raising the reactor temperature to 85° C. under 1000 rpm stirring, ethylene was introduced into the vessel until the pressure reached 325 psig (2586 kPag). Then, 300 mg of a polymerization catalyst was charged into the reactor and the polymerization process proceeded for a period of time. The reaction was then terminated by venting-off hydrocarbons from the reactor. The following examples were all performed using this polymerization process. However, in some examples the amount of hexene-1 and the reaction times were different.

Comparative Example 21A 300 mg of an activated chromium catalyst, the polymerization catalyst, was charged into the reactor and the polymerization process as described above in Example 21 proceeded for about 60 minutes. In this Comparative Example 21A the chromium catalyst was used neat, without aluminum stearate, and resulted in fouling. Heavy polymer coatings were observed on the reactor wall, stirrer and internal thermal couple. Much of the polymer was clumped in the bottom of the reactor. The total amount of the sticky resin collected was 53 grams.

Example 21B

In this example, 300 mg of the activated chromium catalyst prepared above in Example 20 was dry-mixed with 15 mg of aluminum stearate, Witco Aluminum Stearate EA grade. The polymerization process used was as described above in Example 21. After 50 minutes the run was stopped by venting-off the hydrocarbons. It was found that the reactor fouling was much lighter than in Comparative Example 21A. Only a light polymer coating was visible on the stirrer, thermal couple and reactor wall. The total amount of resin collected was about 110 grams.

Comparative Example 21C

This Comparative Example 21C followed the same polymerization process described in Example 21 except 35 ml hexene-1 was used. 300 mg of the activated chromium catalyst as described above in Example 21 was used neat, without any aluminum stearate. The polymerization proceeded for 50 minutes, and the reactor was then vented and inspected. Severe reactor fouling was observed. A ring of polymer about 3 inches (7.62 cm) wide was formed on the top of the reactor with a thickness ranging from ¼ to ¾ of an inch (0.64 to 1.91 of a cm). At the bottom of the reactor wall a polymer sheet was found. The total amount of resin collected was about 139 grams. The polymer was too clumped to determine the polymer density.

Example 21D

This Example 21D followed the same polymerization process described in Example 21 except 35 ml hexene-1 was used. 300 mg of the same activated chromium catalyst used in Comparative Example 21C was dry mixed with 15 mg aluminum stearate, Witco Aluminum Stearate EA grade. The polymerization proceeded for 50 minutes, and the reactor was then vented and inspected. A very minor polymer coating was found on the stirrer, thermal couple and reactor wall. The polymer yield was 139 gram and had a density of 0.9282 g/cc.

In one embodiment, the invention is directed to a continuous process for polymerizing ethylene and at least one alpha-olefin having from 3 to 20 carbon atoms in the presence of a polymerization catalyst comprising a conventional-type chromium metal catalyst and a carboxylate metal salt to produce a polymer product having a density less than 0.945 g/cc down to about 0.910 g/cc, preferably less than 0.940 g/cc, more preferably less than 0.93 g/cc, even more preferably less than 0.928 g/cc, and most preferably less than 0.92 g/cc. In a preferred embodiment the continuous process is a gas phase process operating at a pressure of from 200 psig (1379 Kpa) to about 400 psig (2759 kPa) and at a temperature above 60° C., preferably 70° C., to about 120° C., preferably the gas phase process is also operating in a condensed mode where a liquid and a gas are introduced to a fluidized bed reactor having a fluidizing medium and where the level of condensed is greater than 8 weight percent, preferably greater than 10 weight percent and most preferably greater than 12 weight percent up to 50 weight percent based on the total weight of the fluidizing medium entering the reactor. For further details of a condensed mode process see U.S. Pat. Nos. 5,342,749 and 5,436,304 both of which are herein fully incorporated herein by reference.

While the present invention has been described and illustrated by reference to particular embodiments, those of ordinary skill in the art will appreciate that the invention lends itself to variations not necessarily illustrated herein. For example, it is contemplated that a carboxylate metal salt can be added to reactor in addition to being contacted with the catalyst system of the invention. It is also contemplated that the process of the invention may be used in a series reactor polymerization process. For example, a supported bulky ligand metallocene-type catalyst system free of a carboxylate metal salt is used in one reactor and a supported, bridged, bulky ligand metallocene-type catalyst system having been contacted with a carboxylate metal salt being used in another or vice-versa. It is even further contemplated that the components of a carboxylate metal salt, a carboxylic acid and metal compound, for example a metal hydroxy compound, may be added to the reactor or the polymerization catalyst to form in situ the reactor or with the catalyst. It is also contemplated that a carboxylate metal salt may be separately supported on a carrier different from the polymerization catalyst, preferably a supported polymerization catalyst. For this reason, then, reference should be made solely to the appended claims for purposes of determining the true scope of the present invention.

We claim:

1. A catalyst composition comprising, in combination, a polymerization catalyst comprising a bulky ligand metallocene catalyst compound and a Group 2 or Group 13 metal carboxylate salt wherein the polymerization catalyst and the metal carboxylate salt do not form a reaction product.

2. The catalyst composition of claim 1 wherein the metal carboxylate salt is represented by the formula:

$$MQ_x(OOCR)_y$$

where M is a Group 2 or Group 13 metal from the Periodic table of Elements; Q is a halogen, hydroxy, alkyl, alkoxy, aryloxy, siloxy, silane or sulfonate group; R is a hydrocarbyl radical having from 2 to 100 carbon atoms; x is an integer from 0 to 3; y is an integer from 1 to 4; and the sum of x and y is equal to the valence of the metal M.

3. The catalyst composition of claim 2 wherein y is either 1 or 2, M is a Group 2 or 13 metal, Q is a hydroxy group, and R is a hydrocarbyl radical having greater than 12 carbon atoms.

4. The catalyst composition of claim 1 where the carboxylate metal salt has a melting point of from 100° C. to 200° C.

5. The catalyst composition of claim 1 wherein the carboxylate metal salt is a stearate compound.

6. The catalyst composition of claim 1 wherein the carboxylate metal salt is selected from the group consisting of aluminum mono-stearate, aluminum di-stearate, aluminum tri-stearate, and a combination thereof.

7. The catalyst composition of claim 1 wherein the polymerization catalyst is a supported polymerization catalyst comprising a carrier.

8. The catalyst composition of claim 1 wherein the polymerization catalyst further comprises a carrier and an activator, and wherein the bulky ligand metallocene catalyst compound contains a titanium, zirconium or hafnium atom.

9. The catalyst composition of claim 1 wherein the bulky ligand metallocene catalyst compound is represented by the formula:

$$(C_5H_{4-d}R_d)A_x(C_5H_{4-d}R_d)M\ Q_{g-2}$$

wherein M is a Group 4, 5, 6 transition metal, $(C_5H_{4-d}R_d)$ is an unsubstituted or substituted cyclopentadienyl derived bulky ligand bonded to M, each R is independently hydrogen, a substituent group containing up to 50 non-hydrogen atoms, a substituted or unsubstituted hydrocarbyl having from 1 to 30 carbon atoms, or two or more carbon atoms joined together to form a part of a substituted or unsubstituted ring or ring system having 4 to 30 carbon atoms, A is carbon, germanium, silicon, tin, phosphorous or nitrogen atom, or combination thereof, containing radical bridging two $(C_5H_{4-d}R_d)$ rings; each Q is independently a hydride, substituted or unsubstituted, linear, cyclic or branched, hydrocarbyl having from 1 to 30 carbon atoms, halogen, alkoxide, aryloxide, amide, phosphide, or a univalent anionic ligand, wherein two Q's together may form an alkylidene ligand or cyclometallated hydrocarbyl ligand or other divalent anionic chelating ligand, g is an integer corresponding to the formal oxidation state of M, d is an integer selected from the 0, 1, 2, 3 or 4 and denoting the degree of substitution, and x is an integer from 0 to 1.

10. The catalyst composition of claim 1 wherein the weight percent of the metal carboxylate salt based to the total weight of the polymerization catalyst is in the range of from 0.5 weight percent to 100 weight percent.

11. A method for making a catalyst composition, the method comprising the steps of:

(a) forming a polymerization catalyst comprising a bulky ligand metallocene catalyst compound; and (b) adding at least one Group 2 or Group 13 metal carboxylate salt.

12. The method of claim 11 wherein the polymerization catalyst is dry and free flowing and the metal carboxylate metal is in a solid form.

13. The method of claim 11 wherein the carboxylate metal salt is represented by the formula:

$$MQ_x(OOCR)_y$$

where M is a Group 2 or Group 13 metal from the Periodic Table of Elements; each Q is independently a halogen, hydroxy, alkyl, alkoxy, aryloxy, siloxy, silane or sulfonate group; each R is a hydrocarbyl radical having from 2 to 100 carbon atoms; x is an integer from 0 to 3; y is an integer from 1 to 4; the sum of x and y is equal to the valence of the metal M; Q is halogen or a hydroxy group, and R is a hydrocarbyl radical having from 4 to 24 carbon atoms.

14. The method of claim 11 where the metal carboxylate salt has a melting point of from 100° C. to 200° C.

15. The method of claim 11 wherein the metal carboxylate salt is a stearate compound.

16. The method of claim 11 wherein the metal carboxylate salt is selected from the group consisting of aluminum mono-stearate, aluminum di-stearate, aluminum tri-stearate and combinations thereof.

17. The method of claim 11 wherein the polymerization catalyst is a supported polymerization catalyst comprising a carrier.

18. The method of claim 11 wherein the weight percent of the metal carboxylate salt based to the total weight of the polymerization catalyst is in the range of from 0.5 weight percent to 100 weight percent.

19. A method of making a catalyst composition, the method comprising the steps of:

(a) combining a polymerization catalyst comprising a bulky ligand metallocene catalyst compound with a Group 2 or Group 13 metal carboxylate salt.

20. The method according to claim 19, in which the combining period is from 1 minute to 12 hours.

* * * * *